(12) United States Patent
Wink

(10) Patent No.: US 11,479,454 B1
(45) Date of Patent: Oct. 25, 2022

(54) DRINKING WATER AND CLEANING PRODUCT REFILL STATION

(71) Applicant: John Wink, Evansville, IN (US)

(72) Inventor: John Wink, Evansville, IN (US)

(*) Notice: Subject to any disclaimer, the term of this patent is extended or adjusted under 35 U.S.C. 154(b) by 0 days.

(21) Appl. No.: 17/345,061

(22) Filed: Jun. 11, 2021

(51) Int. Cl.
| | |
|---|---|
| *B67C 3/22* | (2006.01) |
| *B67C 7/00* | (2006.01) |
| *B08B 3/02* | (2006.01) |
| *B08B 3/14* | (2006.01) |
| *C02F 1/44* | (2006.01) |
| *B67C 3/02* | (2006.01) |
| *B67C 3/24* | (2006.01) |
| *B08B 9/32* | (2006.01) |
| *B01F 23/43* | (2022.01) |
| *B01F 27/1125* | (2022.01) |
| *B01F 35/71* | (2022.01) |
| *A47K 10/36* | (2006.01) |
| *B01F 101/00* | (2022.01) |

(52) U.S. Cl.
CPC ............ *B67C 7/0073* (2013.01); *B01F 23/43* (2022.01); *B01F 27/1125* (2022.01); *B01F 35/7176* (2022.01); *B08B 3/02* (2013.01); *B08B 3/14* (2013.01); *B08B 9/32* (2013.01); *B67C 3/026* (2013.01); *B67C 3/225* (2013.01); *B67C 3/242* (2013.01); *C02F 1/441* (2013.01); *A47K 10/3606* (2013.01); *B01F 2101/4505* (2022.01); *B08B 2209/08* (2013.01); *B08B 2230/01* (2013.01); *B67C 2003/228* (2013.01)

(58) Field of Classification Search
CPC ....... B67C 7/0073; B67C 3/026; B67C 3/225; B67C 3/242; B67C 2003/228; B01F 23/43; B01F 27/1125; B01F 35/7176; B01F 2101/4505; B08B 3/02; B08B 3/14; B08B 9/32; B08B 2209/08; B08B 2230/01; A47K 10/3606
See application file for complete search history.

(56) References Cited

U.S. PATENT DOCUMENTS

| | | | | | |
|---|---|---|---|---|---|
| 2,681,872 | A | * | 6/1954 | McCabe | B08B 9/30 134/131 |
| 4,667,690 | A | * | 5/1987 | Hartnig | B08B 9/30 134/144 |
| 4,753,844 | A | * | 6/1988 | Jones | C11D 7/5009 442/170 |
| 4,904,524 | A | * | 2/1990 | Yoh | A61K 8/0208 428/308.8 |
| 5,343,886 | A | * | 9/1994 | Beswick | B08B 9/423 134/131 |
| 5,409,545 | A | * | 4/1995 | Levey | B08B 9/28 134/25.4 |
| 6,009,889 | A | * | 1/2000 | Brenkus | B08B 9/30 134/22.12 |

(Continued)

*Primary Examiner* — Nicolas A Arnett
(74) *Attorney, Agent, or Firm* — Larson & Larson, P.A.; Justin P. Miller; Frank Liebenow

(57) ABSTRACT

The water, cleaner, and wipe supply station includes multiple, related functions. Specifically: cleaning and refilling bottles with drinking water; cleaning and refilling cleaning product containers; and cleaning and refilling containers with pre-moistened wipes. The result is a reduction of waste introduced into landfills, and a means of centrally distributing clean water, cleaning products, and wipes without the need for additional containers.

14 Claims, 19 Drawing Sheets

(56) References Cited

U.S. PATENT DOCUMENTS

| | | | | |
|---|---|---|---|---|
| 7,165,582 | B2* | 1/2007 | Till | B67C 7/0086 |
| | | | | 141/144 |
| 7,603,829 | B2* | 10/2009 | Brombin | A61L 2/208 |
| | | | | 53/317 |
| 8,356,461 | B2* | 1/2013 | Cedrone | B67C 7/00 |
| | | | | 53/484 |
| 10,494,245 | B2* | 12/2019 | Bruch | B08B 9/423 |
| 2008/0317624 | A1* | 12/2008 | Gueguen | B08B 9/30 |
| | | | | 422/26 |
| 2010/0071724 | A1* | 3/2010 | Baumgartner | B08B 9/34 |
| | | | | 134/166 R |

* cited by examiner

DRINKING WATER AND CLEANING PRODUCT REFILL STATION

FIELD

This invention relates to the field of water and cleaning product dispensers and more particularly to a device that cleans and refills containers for cleaning products and drinking water.

BACKGROUND

Cleaning products and drinking water are distributed and sold in single-use plastic bottles. After the contents of the container are used, the container is thrown away. The result is tremendous waste, with the majority of plastics being landfilled rather than recycled or reused.

This is particularly unfortunate because the containers are generally robust enough to support multiple uses.

This is a particular problem in areas affected by natural disasters, where relief supplies are distributed in single-use containers, and additional supplies could be distributed if the containers could be reused.

But systems do not exist for the convenient cleaning and refilling of plastic bottles with new cleaning solution or clean water.

What is needed is a device that can clean an existing bottle, and then refill with clean water, cleaning solution, or wet towels.

SUMMARY

The water, cleaner, and wipe supply station includes multiple, related functions. Specifically:
  Cleaning and refilling bottles with drinking water;
  Cleaning and refilling cleaning product containers; and
  Cleaning and refilling containers with pre-moistened wipes.

The result is a reduction of waste introduced into landfills, and a means of centrally distributing clean water, cleaning products, and wipes without the need for additional containers.

Regarding the drinking water function, the used water bottles/containers are cleaned and sanitized, and then filled with clean water that is filtered and/or processed by Reverse Osmosis ("RO" or "RO water").

The water source is external to the device, likely provided by a well, city water, or water tank.

The bottles are loaded by a user, and held on a rotating platform. The rotating platform includes a face for a large bottle, and a face for multiple small bottles. The faces have recesses that match the base diameter of the associated bottle sizes.

The platform faces are optionally replaceable to allow for alteration as water bottle sizes change.

The large bottle is, for example, a 1-, 2-, or 5-liter bottle, or gallon-sized containers.

The small bottles are each, for example, 16.9 fluid ounces.

After steam cleaning using a preferred mixture of 4% heated water and 96% dry air, the bottles are filled with filtered water and/or water processed Reverse Osmosis ("RO" or "RO water"), after which the user seals and caps the bottles, finally unloading the bottles.

The steam cleaning sanitizes both the inside and outside of the bottles, cleaning inside surfaces from previous liquids and outside surfaces from any contaminants from previous handling.

Regarding the cleaning products function, the used cleaning product containers are optionally cleaned and sanitized, and then filled with filtered or RO water, combined with a concentrated cleaning product.

The concentrated cleaning products can be provided in multiple formats. For example, a refillable tank, or a cartridge system where the user does not come into contact with the chemical but rather swaps out empty concentrate cartridges for full concentrate cartridges.

The concentrates can include a multitude of different products, including shampoo concentrate, bleach concentrate, laundry detergent, and spray cleaning solution.

Regarding the pre-moistened wipe dispenser, the user supplies a container that is filled with a mix of filtered water, or RO water, and concentrated cleaning solution. Rolled towel material is re-rolled in a smaller quantity, cut, and dropped into the container.

The water, cleaner, and wipe supply station can be stationary or mobile, as large as a trailer or as small as a toaster, making it useful when installed in a store, or moved to the site of a disaster.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
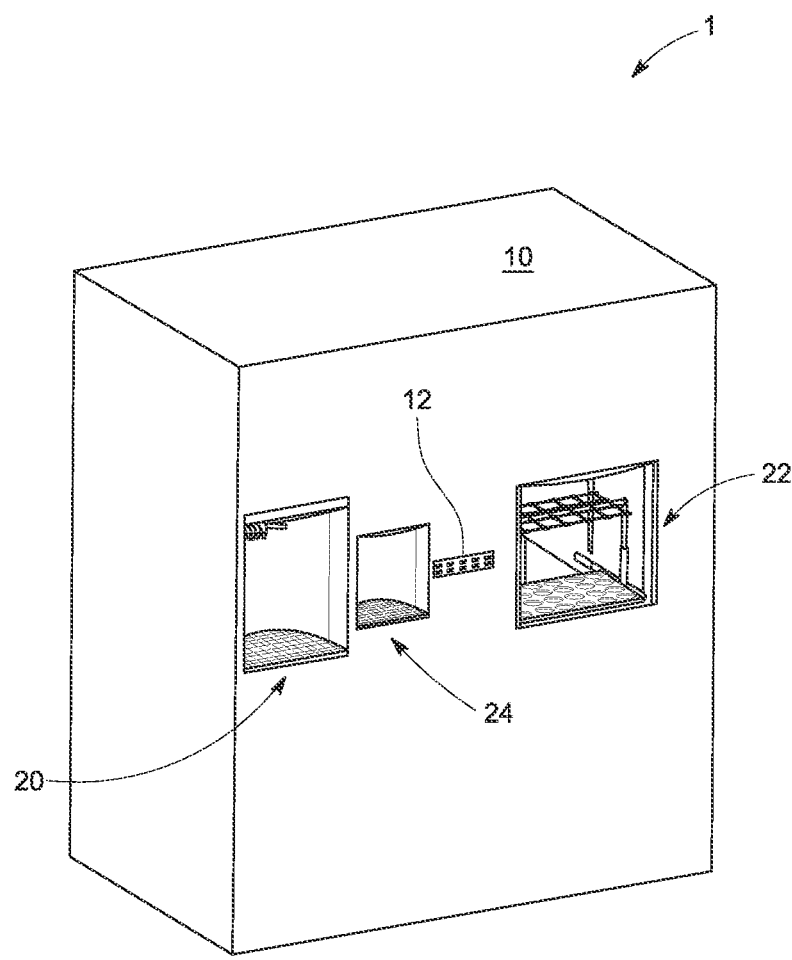
FIG. 1 illustrates a front outside view of the water, cleaner, and wipe supply station.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a front outside view of the water, cleaner, and wipe supply station is shown.

The water, cleaner, and wipe supply station 1 includes a housing 10, on which is placed a user interface 12 for control.

The user can access a cleaner dispensing station 20, water dispensing station 22, and towel dispensing station 24.

Figure 2:
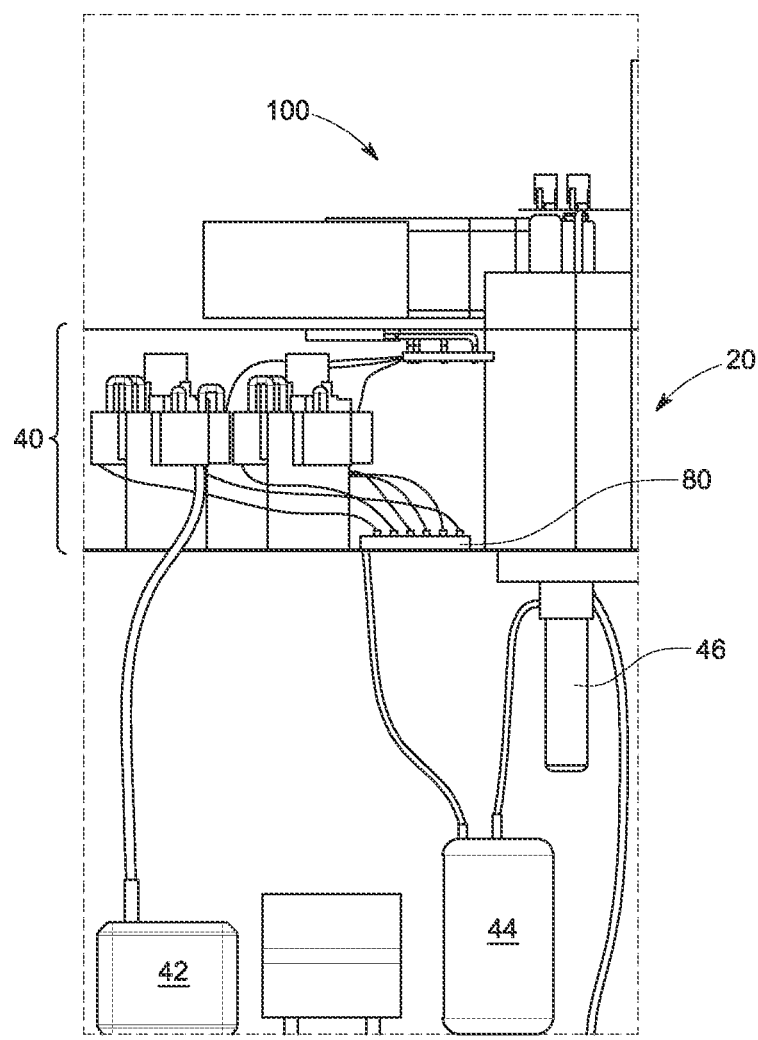
FIG. 2 illustrates an interior view of the water, cleaner, and wipe supply station.

Referring to FIG. 2, an interior view of the water, cleaner, and wipe supply station is shown.

The cleaner dispensing station 20 is shown from the side, with its associated parts including the mixing tank assembly 40 with concentrate storage 42, water reservoir 44, and RO assembly 46.

As discussed above, the concentrate storage 42 can be in the form of cartridges, a refillable tank, or other forms of storage.

The distribution valve 80 controls the flow of water through the system.

The towel rolling and cutting system 100 is also visible, discussed further below.

Figure 3:
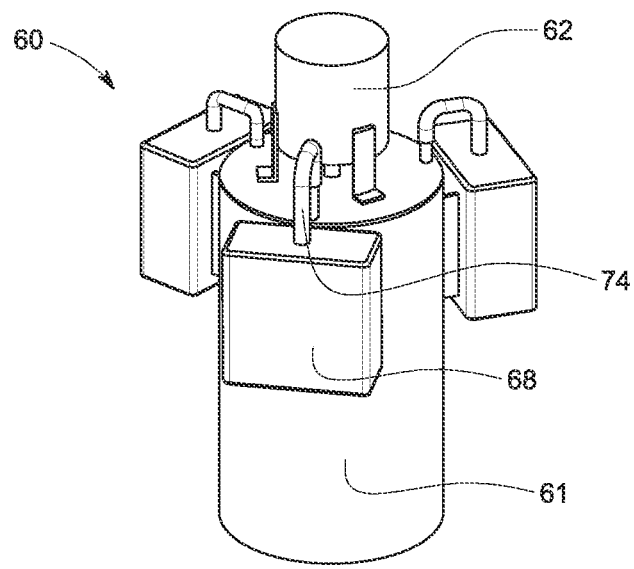
FIG. 3 illustrates a detail view of the cleaning solution mixer of the water, cleaner, and wipe supply station.
Figure 4:
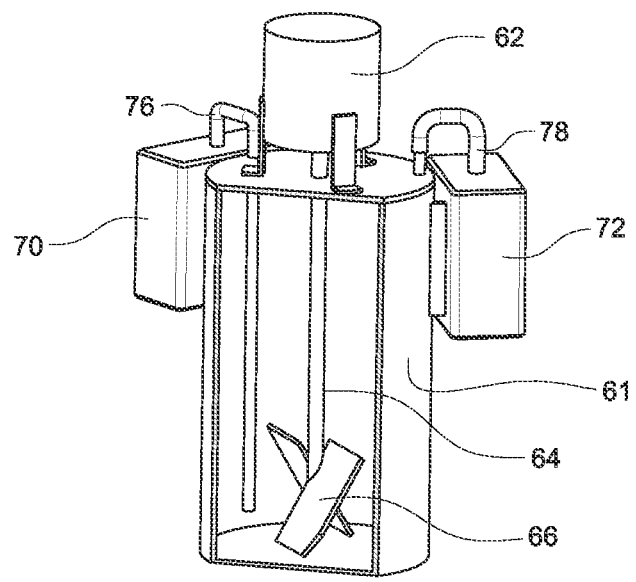
FIG. 4 illustrates a cross-sectional view of the cleaning solution mixer of the water, cleaner, and wipe supply station.

Referring to FIGS. 3 and 4, a detail view and a cross-sectional view of the cleaning solution mixer of the water, cleaner, and wipe supply station are shown.

A concentrate pump 72 pushes concentrate through a concentrate outlet line 78, and an RO pump 68 injects reverse-osmosis treated water via the RO outlet line 74. The concentrate and water are then mixed inside the mixing tank assembly 60, which includes a mixing motor 62 connected to a mixing shaft 64 with mixing paddle 66, and the mixing paddle 66 within the mixing vessel 61.

The resulting diluted solution of cleaner is pushed out by the cleaning solution pump 70 using the cleaner outlet line 76. The mixture of cleaning solution is held within the mixing tank 61 until needed.

Figure 5:
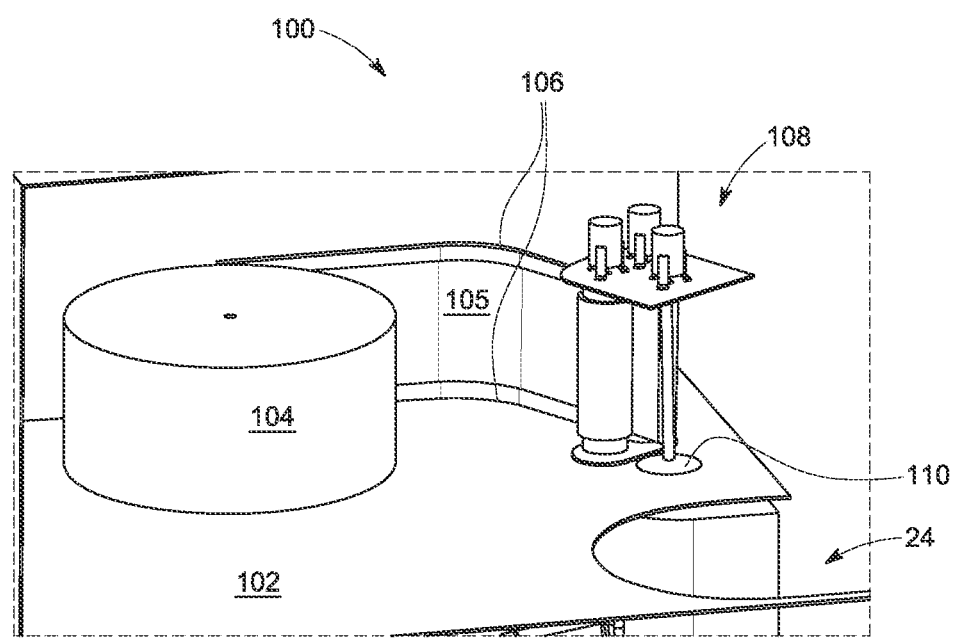
FIG. 5 illustrates a view of the towel rolling and cutting assembly of the water, cleaner, and wipe supply station.

Referring to FIG. 5, a view of the towel rolling and cutting assembly of the water, cleaner, and wipe supply station is shown.

The towel rolling and cutting system 100 includes a towel dispenser floor 102. The towel 105 from the bulk towel roll 104 passes along the towel guide tracks 106 to the towel cutting and advancing assembly 108, which is discussed further below. After rolling and cutting, the towel 105 drops through the rolled towel exit 110 to the towel dispensing station 24.

Figure 6:
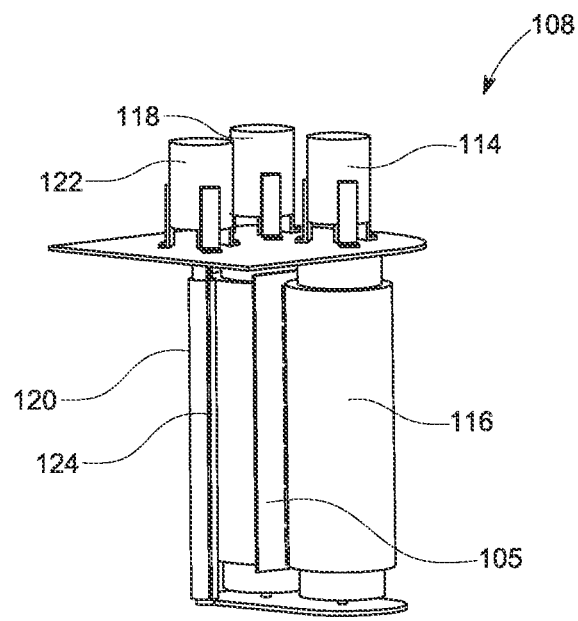
FIG. 6 illustrates a detail view of the towel perforation and cutting components of the water, cleaner, and wipe supply station.
Figure 7:
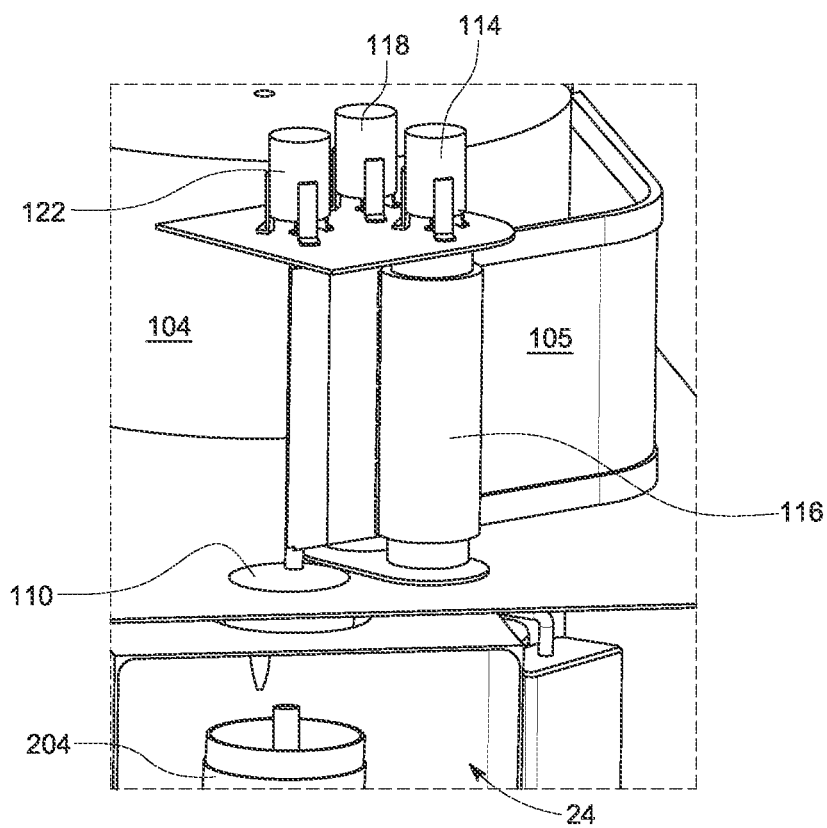
FIG. 7 illustrates a second detail view of the towel perforation and cutting components of the water, cleaner, and wipe supply station.

Referring to FIGS. 6 and 7, two detail views of the towel perforation and cutting components of the water, cleaner, and wipe supply station are shown.

The towel cutting and advancing assembly 108 includes a first towel perforation motor 114 rotating the towel perforation knife roller 116, and a second towel perforation motor 118 rotating the towel perforation knife receiving roller 120. As the towel 105 passes between the rollers 116/120, it is perforated. The perforation allows tearing of the towel/towel material 105 along the resulting perforations.

The towel 105 is gathered on the towel clamp bar 124, rotated by the towel clamp motor 122. When the towel roll is complete, the rollers 116/120 stop in place, and the towel clamp motor 122 continues rotating, tearing the towel 105.

Figure 8:
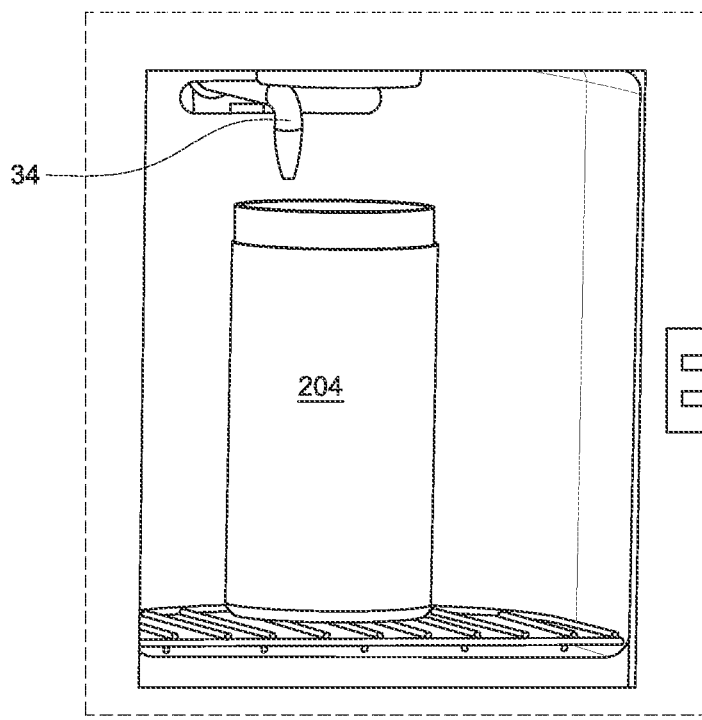
FIG. 8 illustrates a view of the towel dispenser of the water, cleaner, and wipe supply station.
Figure 9:
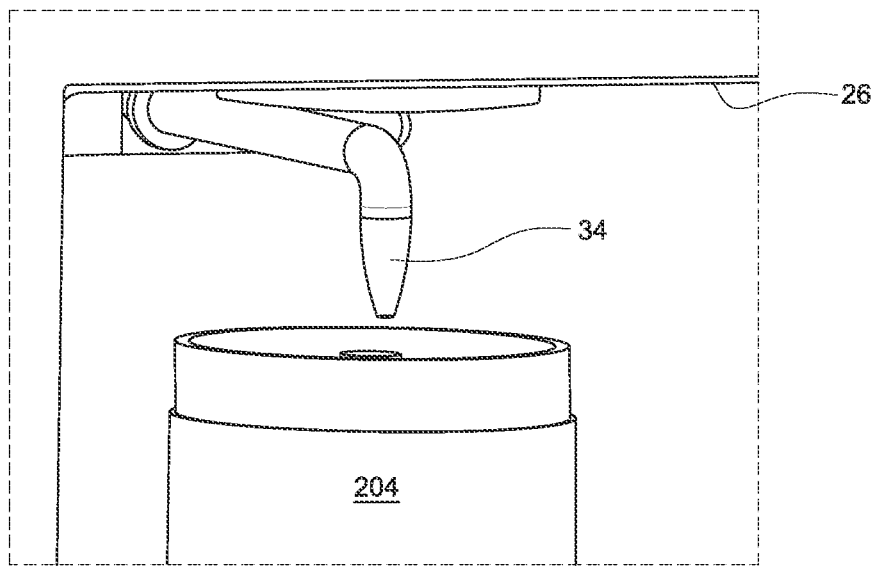
FIG. 9 illustrates a second view of the towel dispenser of the water, cleaner, and wipe supply station.

Referring to FIGS. 8 and 9, two views of the towel dispenser of the water, cleaner, and wipe supply station are shown.

The drop-down door 26 is shown, able to lower to prevent a user from contacting the system when in operation.

The towel solution dispensing nozzle 34 allows the towel cleaning solution to be injected into the towel container 204.

Figure 10:
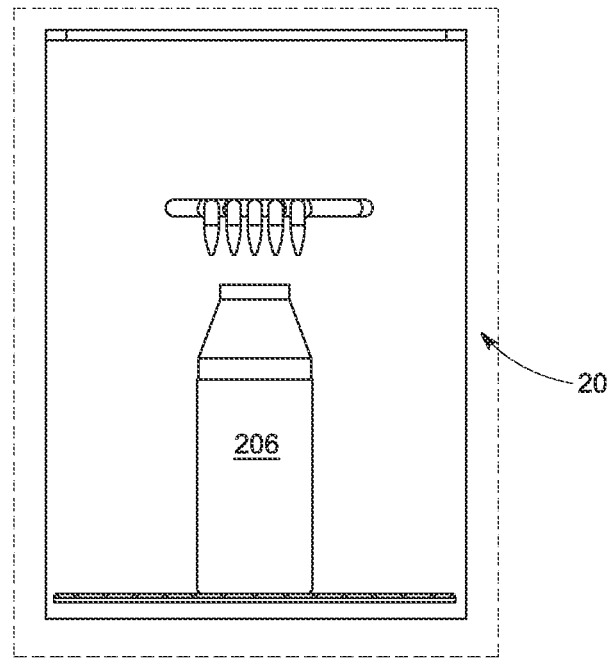
FIG. 10 illustrates a view of the cleaning products dispenser of the water, cleaner, and wipe supply station.
Figure 11:
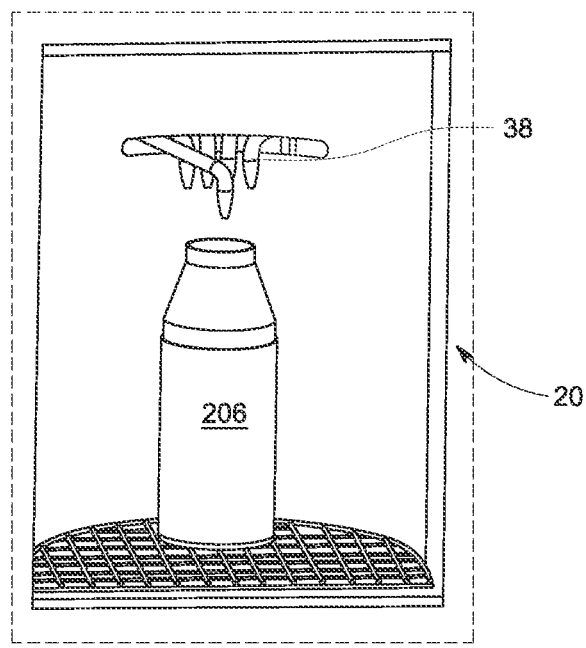
FIG. 11 illustrates a second view of the cleaning products dispenser of the water, cleaner, and wipe supply station.

Referring to FIGS. 10 and 11, two views of the cleaning products dispenser of the water, cleaner, and wipe supply station is shown.

The cleaner container 206 is shown inside cleaner dispensing station 20, with cleaning solution dispensing nozzles 38, with differing nozzles for dispensing different cleaning solutions.

Figure 12:
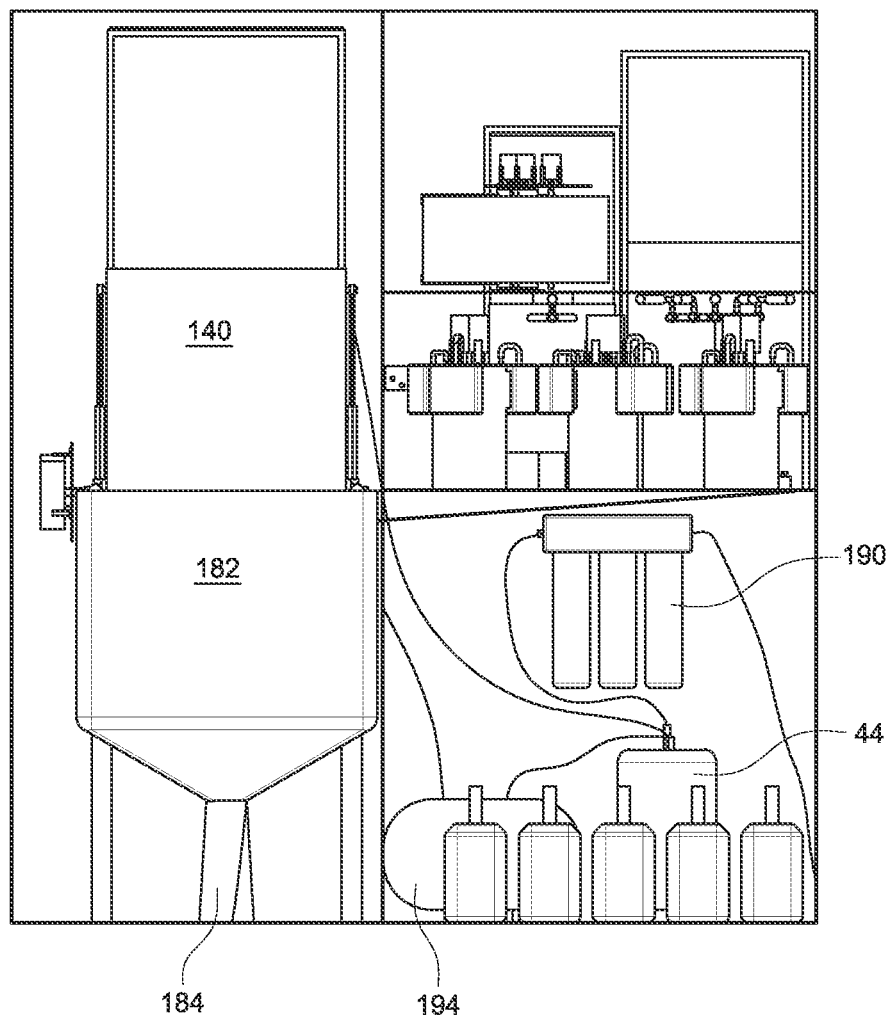
FIG. 12 illustrates a second interior view of the water, cleaner, and wipe supply station.

Referring to FIG. 12, a second interior view of the water, cleaner, and wipe supply station is shown.

The water dispensing housing 140 is shown, with bottle cleaning housing 182 below it, leading to drain 184.

Also shown is RO assembly 190 that passes water to a clean water reservoir 44, a portion of which is used to operate the steam generator 194.

Figure 13:
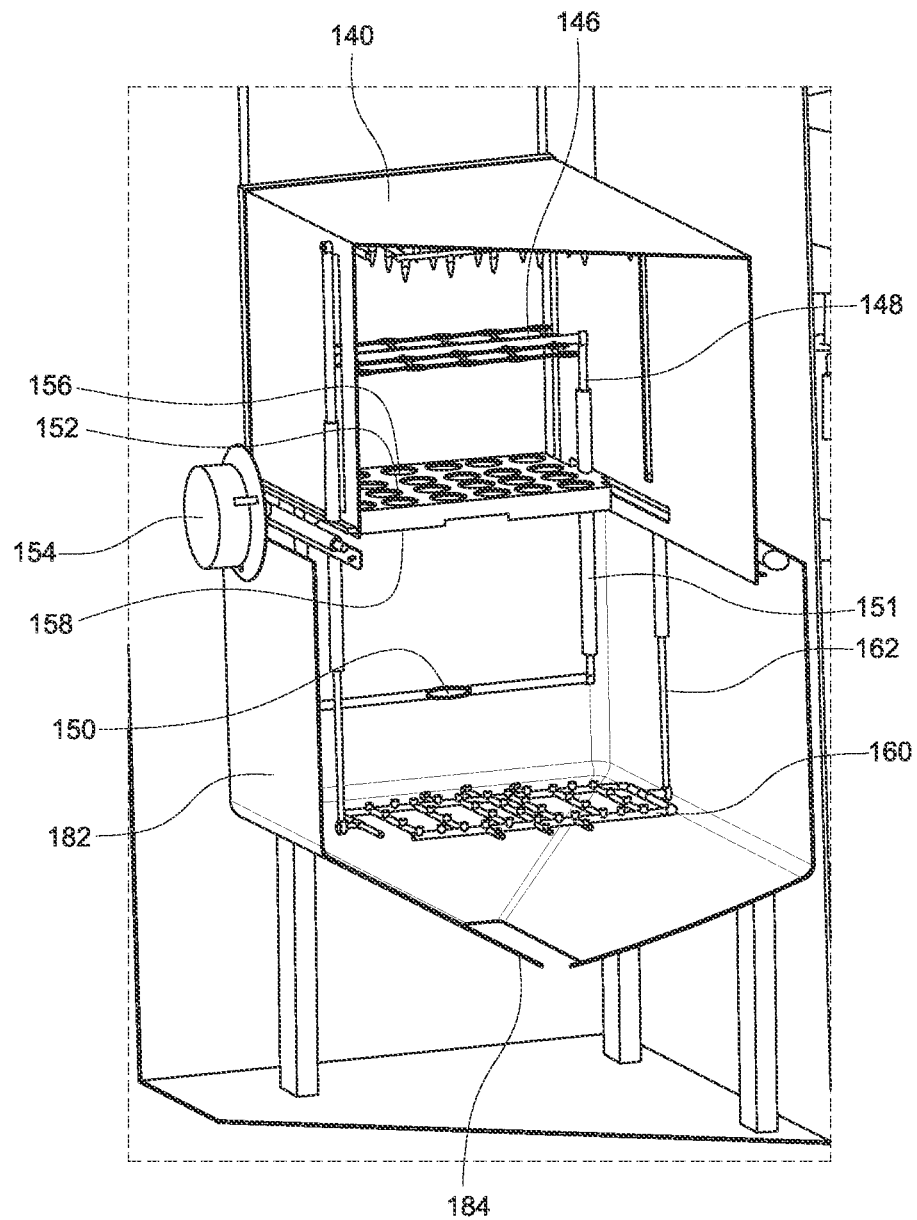
FIG. 13 illustrates a detailed interior view of the water bottle section of the water, cleaner, and wipe supply station.

Referring to FIG. 13, a detailed interior view of the water bottle section of the water, cleaner, and wipe supply station is shown.

The water dispensing housing 140 encloses the small bottle clamp assembly 146, which is operated by the small bottle clamp actuator 148.

The large bottle clamp assembly 150 is operated by the large bottle clamp actuator 151.

The bottle platform 152 is rotated by the bottle platform actuator 154, positioning the small bottle side 156 or the large bottle side 158 facing up, depending on the needs of the user.

The steaming cleaning nozzle assembly 160 is operated by the steam cleaning nozzle actuator 162.

Figure 14:
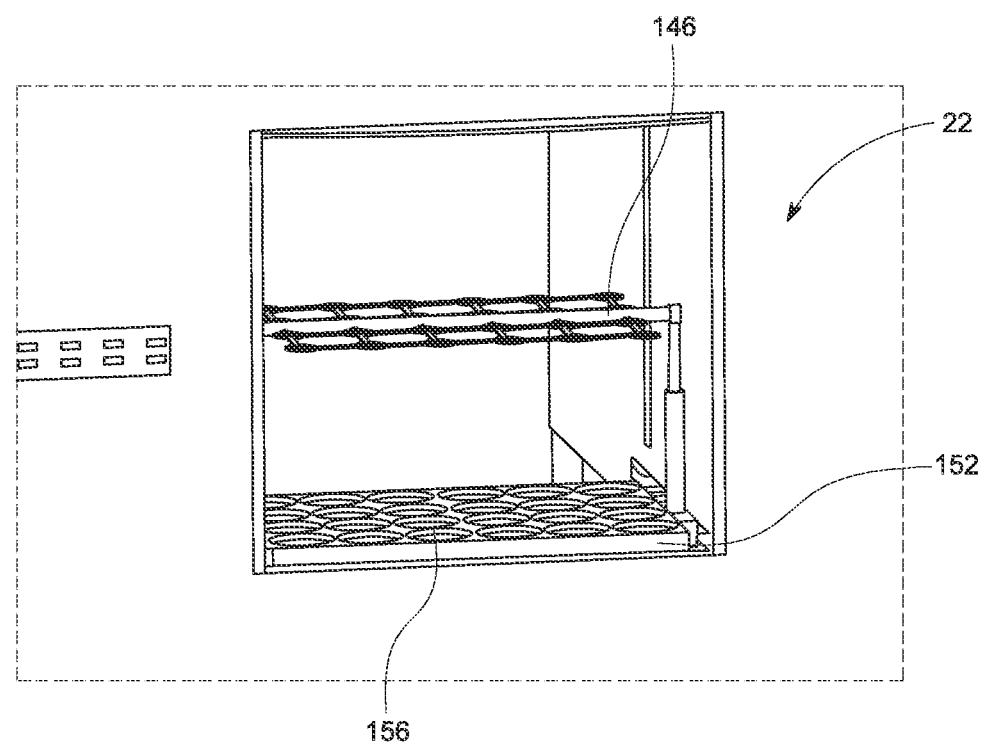
FIG. 14 illustrates a view of the water bottle filling section of the water, cleaner, and wipe supply station.

Referring to FIG. 14, a view of the water bottle filling section of the water, cleaner, and wipe supply station is shown, ready to fill small water bottles.

The water dispensing station 22 is shown, with the small bottle clamp assembly 146 is visible above the bottle platform 152, shown with the small bottle side 156 exposed.

Figure 15:
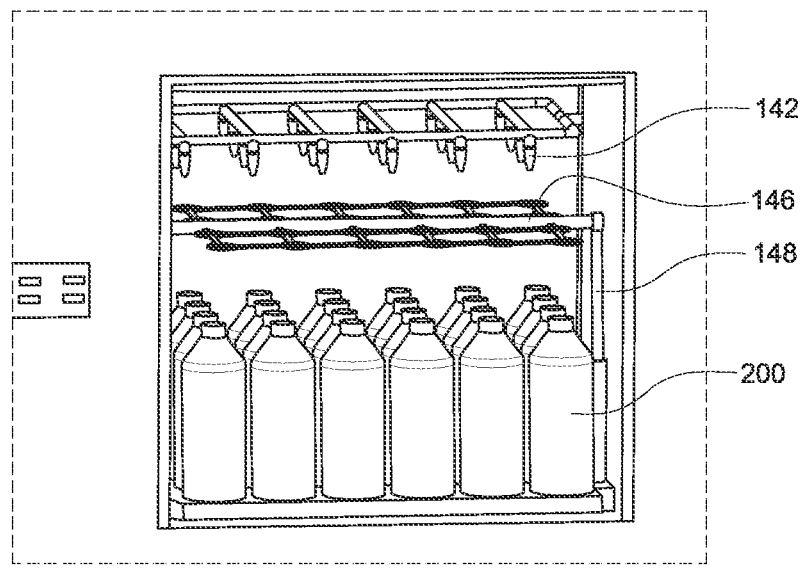
FIG. 15 illustrates a view of small water bottles placed on the rotating platform of the water, cleaner, and wipe supply station.
Figure 16:
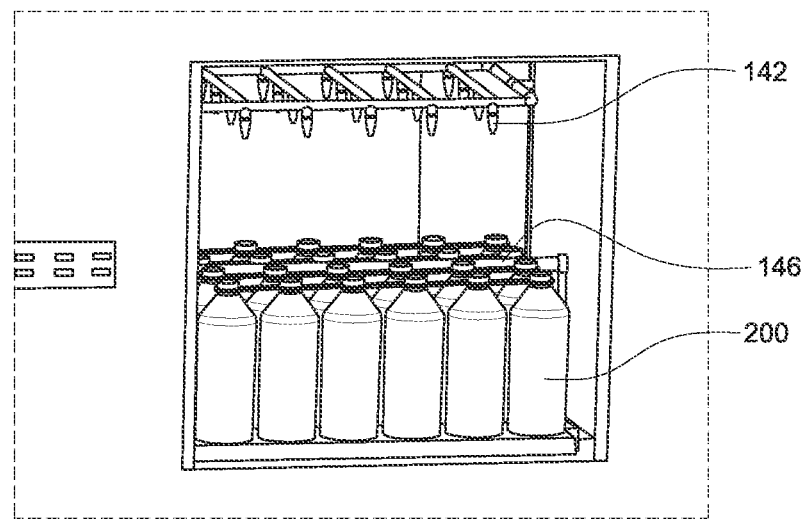
FIG. 16 illustrates a view of the small water bottles locked to the rotating platform of the water, cleaner, and wipe supply station.

Referring to FIGS. 15 and 16, two views of water bottles placed on the rotating platform of the water, cleaner, and wipe supply station is shown.

The water dispensing nozzle assembly 142 is shown above the small bottle clamp assembly 146, which passes over the small water bottles 200 to hold them in place.

Figure 17:
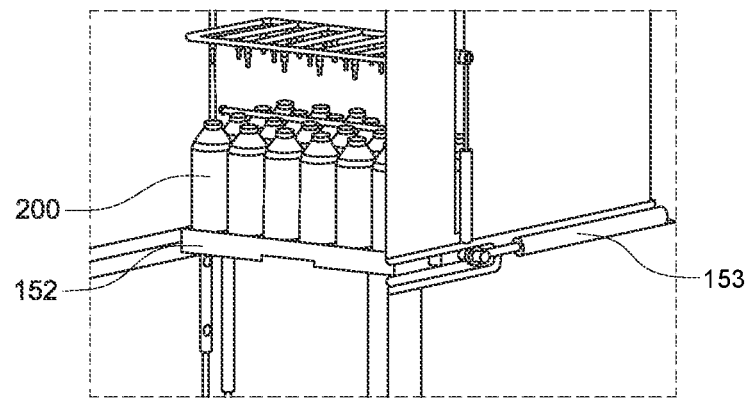
FIG. 17 illustrates a view of the small water bottles before rotation for cleaning, of the water, cleaner, and wipe supply station.
Figure 18:
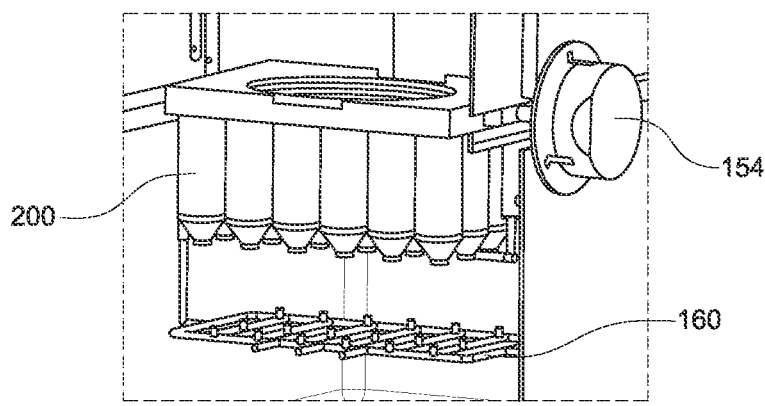
FIG. 18 illustrates a view of the small water bottles after rotation for cleaning, of the water, cleaner, and wipe supply station.
Figure 19:
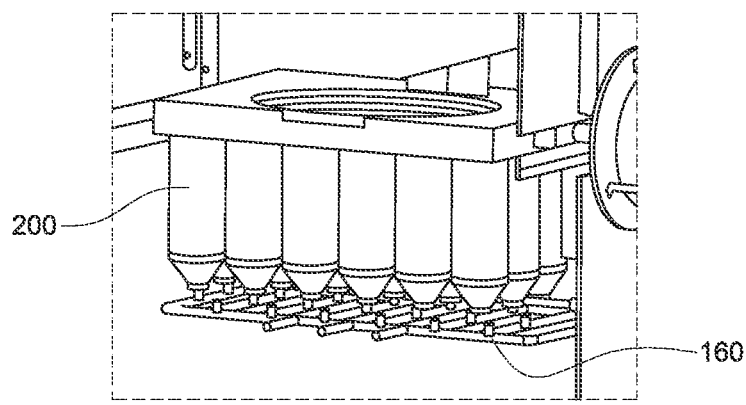
FIG. 19 illustrates a view of the small water bottles during cleaning, of the water, cleaner, and wipe supply station.

Referring to FIGS. 17, 18, and 19, three views of the water bottles before and after rotation for cleaning, of the water, cleaner, and wipe supply station, are shown.

FIG. 17 shows the bottle platform 152 ready for loading the small water bottles. The bottle platform extension actuator 153 moves the bottle platform 152 in and out, the bottle platform actuator 154 rotates the bottle platform 152 to expose the small bottle side 156 (see FIG. 14) or the large bottle side 158 (see FIG. 25).

The small water bottles 200 are then rotated by the interaction of the bottle platform actuator 154 and the bottle platform 152. The small water bottles 200 are inverted for cleaning.

The small water bottles 200 then interact with the steam cleaning nozzle assembly 160. Steam is injected, cleaning the small water bottles 200, with contaminants allowed to drip out.

Figure 20:
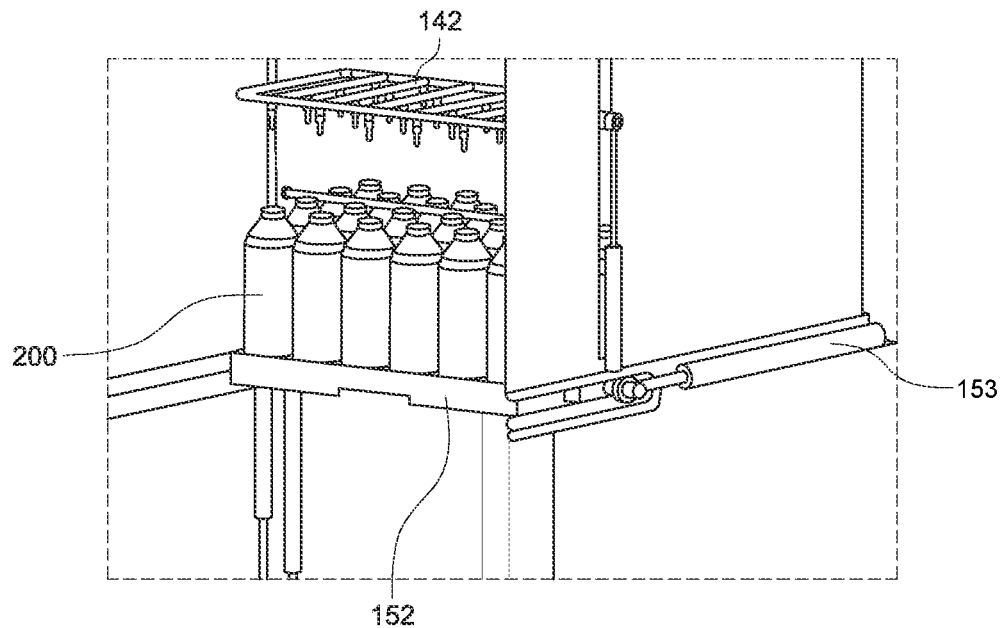
FIG. 20 illustrates a view of the small water bottles after cleaning, of the water, cleaner, and wipe supply station.
Figure 21:
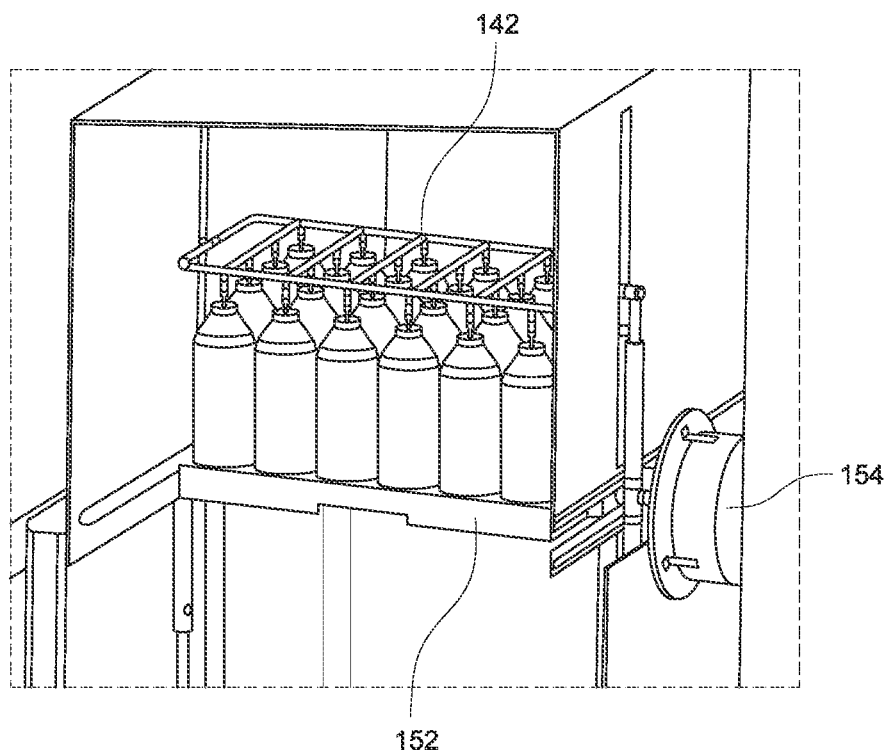
FIG. 21 illustrates a view of the small water bottles during filling, of the water, cleaner, and wipe supply station.

Referring to FIGS. 20 and 21, a view of the water bottles after cleaning and during filling, of the water, cleaner, and wipe supply station, are shown.

The small water bottles 200 are rotated upward, the water dispensing nozzle assembly 142 is lowered to fill the bottles 200.

Figure 22:
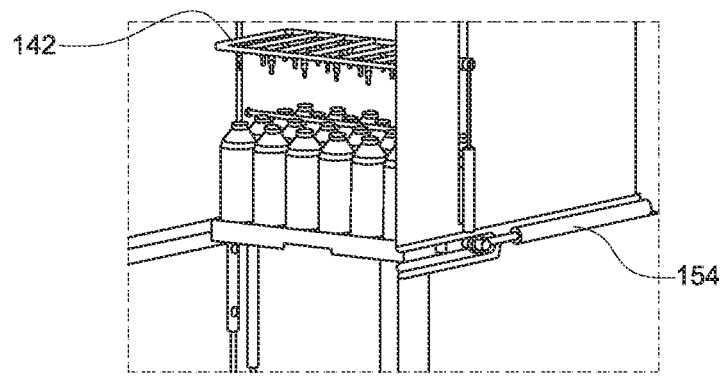
FIG. 22 illustrates a view of the small water bottles after filling, of the water, cleaner, and wipe supply station.
Figure 23:
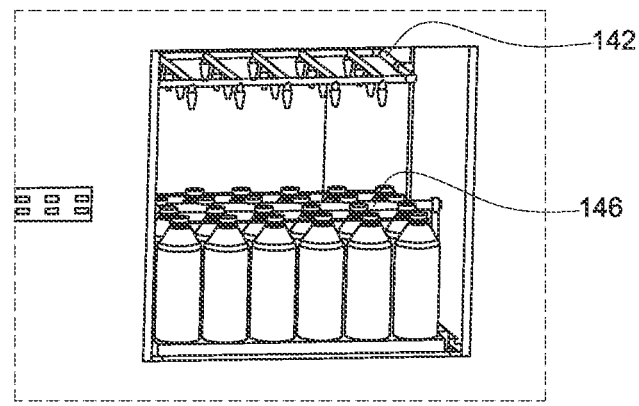
FIG. 23 illustrates a view of the small water bottles ready for capping, of the water, cleaner, and wipe supply station.
Figure 24:
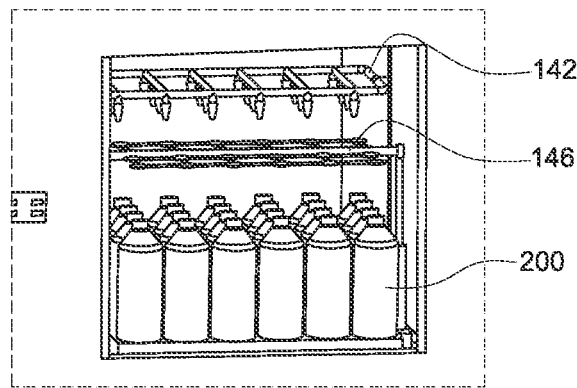
FIG. 24 illustrates a view of the small water bottles ready for removal, of the water, cleaner, and wipe supply station.

Referring to FIGS. 22, 23, and 24, additional views of the water bottles after filling of the water, cleaner, and wipe supply station are shown. The water dispensing nozzle assembly 142 is then raised, the small bottle clamp assembly 146 staying lowered on the water bottles 200 to allow the user to place caps. The small bottle clamp assembly 146 is then lifted, allowing the user to remove the small water bottles 200.

Figure 25:
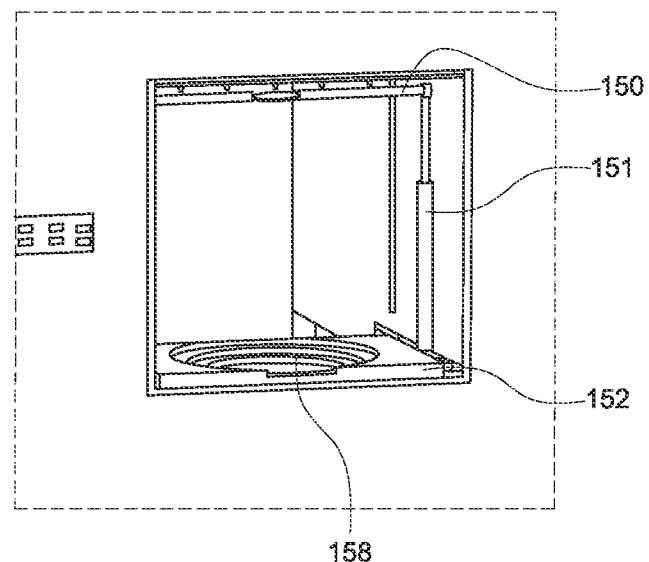
FIG. 25 illustrates a view of the platform rotated for a large water bottle, of the water, cleaner, and wipe supply station.
Figure 26:
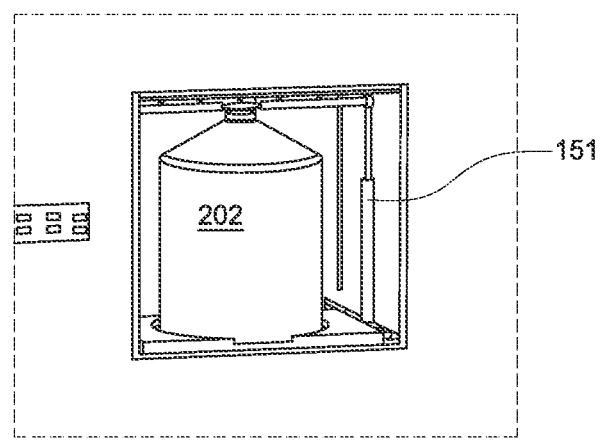
FIG. 26 illustrates a view of the large water bottle of the water, cleaner, and wipe supply station.

Referring to FIGS. 25 and 26, two views of the platform rotated for a large water bottle of the water, cleaner, and wipe supply station are shown.

The large bottle clamp assembly 150 is shown with large bottle clamp actuator 151. The bottle platform 152 is rotated to expose the large bottle side 158.

The large bottle 202 is shown placed, ready to be cleaned and filled.

Figure 27:
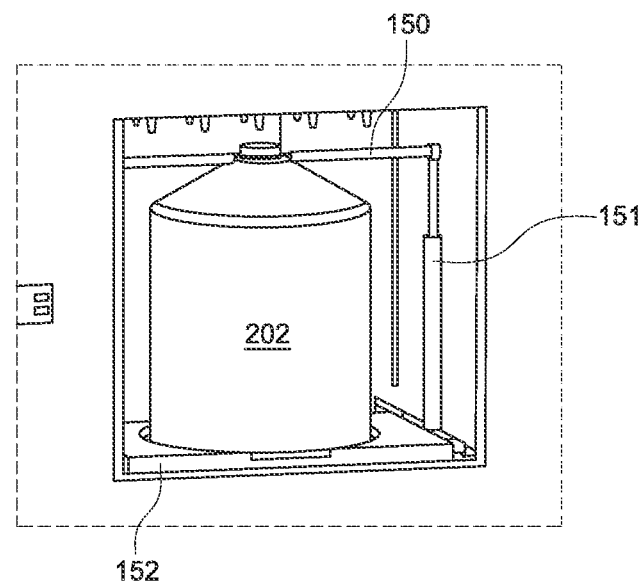
FIG. 27 illustrates a first view of the large water bottle before rotation, for cleaning of the water, cleaner, and wipe supply station.
Figure 28:
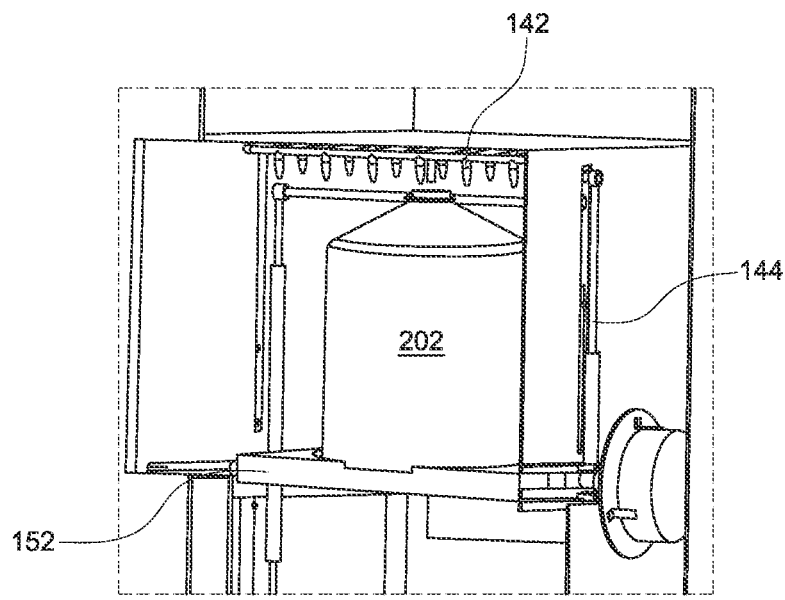
FIG. 28 illustrates a second view of the large water bottle before rotation, for cleaning of the water, cleaner, and wipe supply station.

Referring to FIGS. 27 and 28, a first and second view of the large bottle before rotation for cleaning of the water, cleaner, and wipe supply station are shown.

The large bottle 202 is held by the large bottle clamp actuator, ready to be rotated for cleaning. The water dispensing nozzle assembly 142 and water dispensing nozzle actuator 144 are visible.

Figure 29:
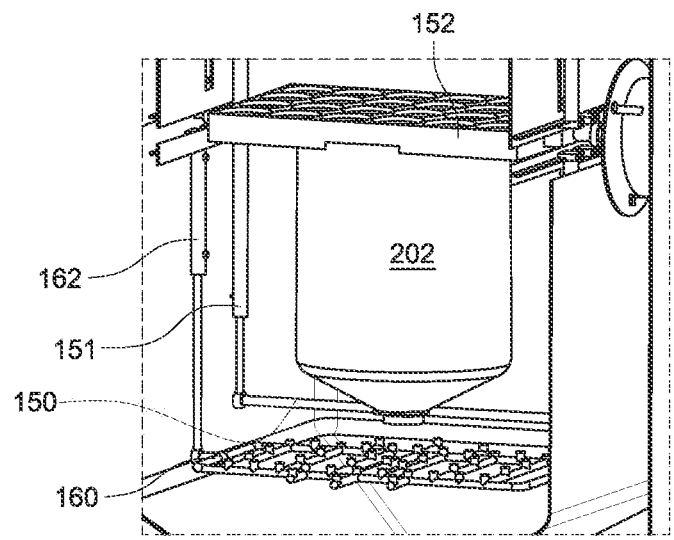
FIG. 29 illustrates a view of the large water bottle after rotation for cleaning, of the water, cleaner, and wipe supply station.
Figure 30:
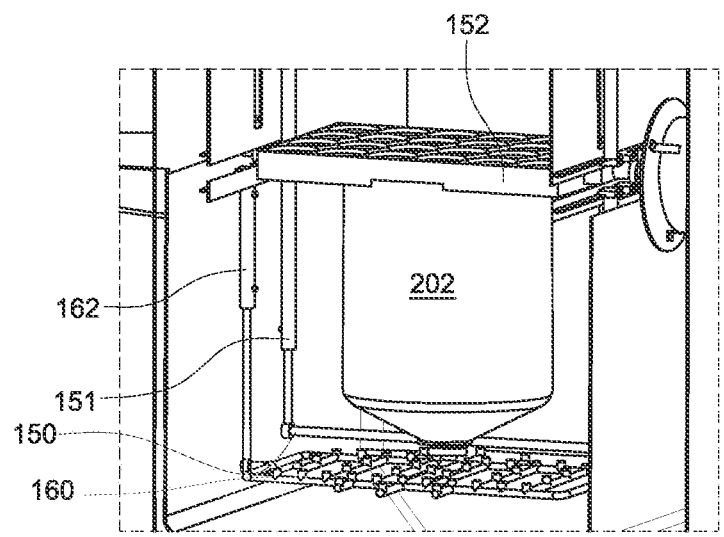
FIG. 30 illustrates a view of the large water bottle during cleaning, of the water, cleaner, and wipe supply station.

Referring to FIGS. 29 and 30, two views of the large bottle after rotation for cleaning of the water, cleaner, and wipe supply station are shown.

The large bottle 202 is rotated to an inverted position, the large bottle clamp assembly 150 and large bottle clamp actuator 151 holding it in place.

The steam cleaning nozzle actuator 162 raises the steaming cleaning nozzle assembly 160 to spray into the large bottle 202, cleaning its internal surfaces and allowing draining.

Figure 31:
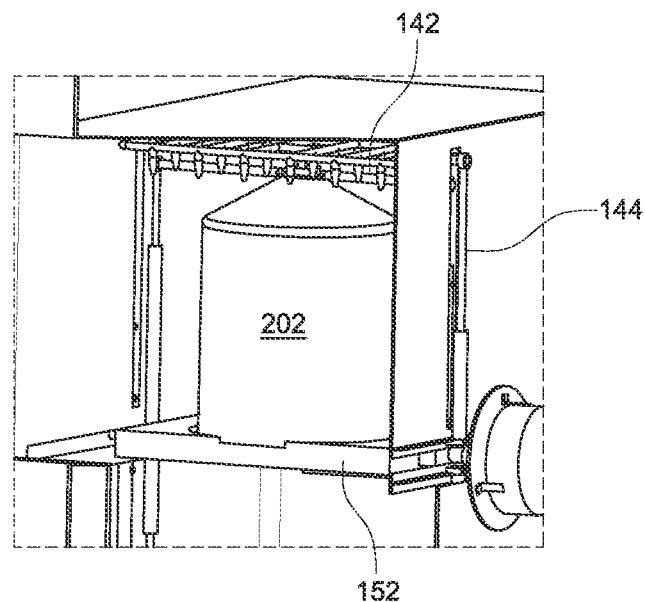
FIG. 31 illustrates a view of the large water bottle during filling, of the water, cleaner, and wipe supply station.
Figure 32:
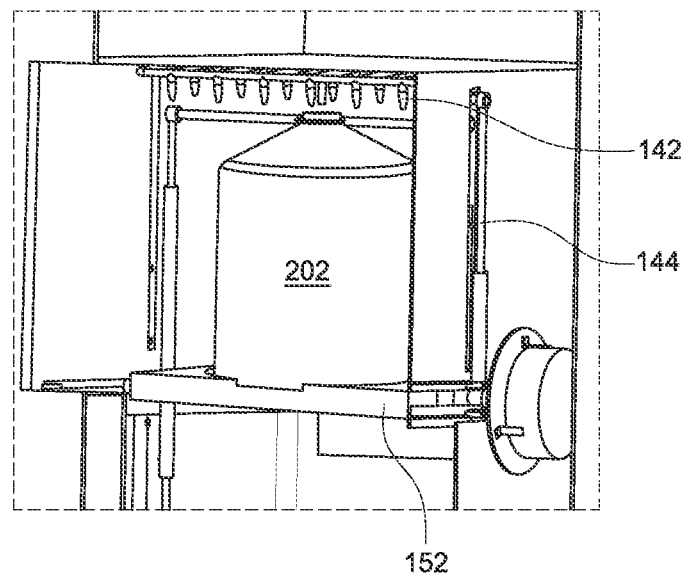
FIG. 32 illustrates a view of the large water bottle ready for capping, of the water, cleaner, and wipe supply station.

Referring to FIGS. 31 and 32, two views of the large bottle during filling of the water, cleaner, and wipe supply station are shown.

The water dispensing nozzle assembly 142 is lowered toward the large bottle 202 by the water dispensing nozzle actuator 144, allowing filling.

Figure 33:
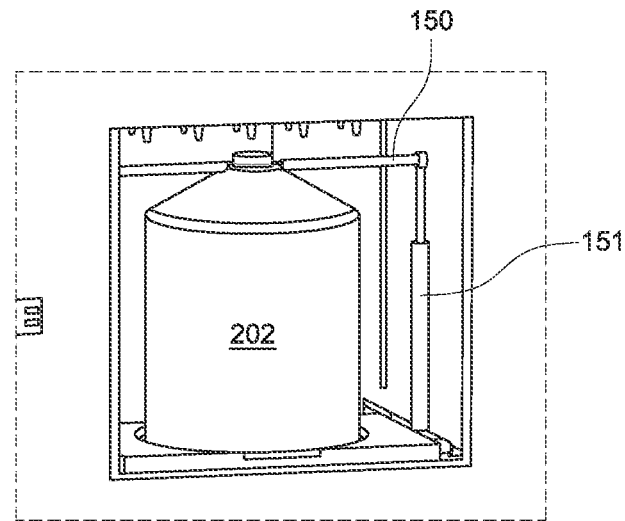
FIG. 33 illustrates a second view of the large water bottle ready for capping, of the water, cleaner, and wipe supply station.

Referring to FIG. 33, a second view of the large bottle ready for capping of the water, cleaner, and wipe supply station is shown.

The large bottle 202 is ready for capping, the large bottle clamp assembly 150 and large bottle clamp actuator 151 holding the large bottle 202 in place.

Figure 34:
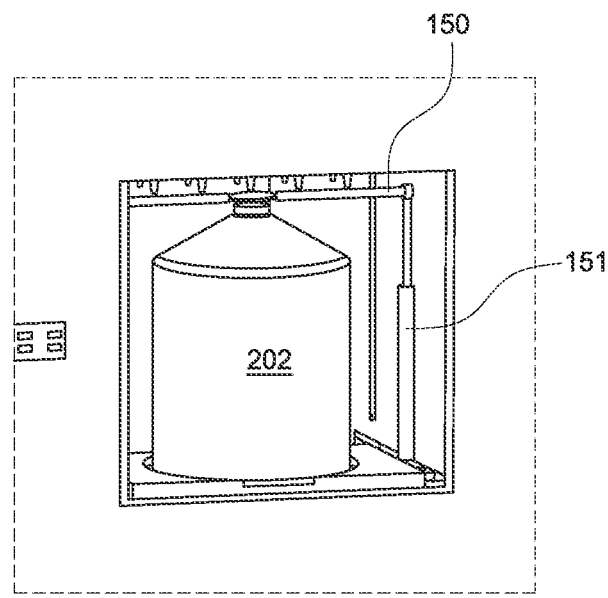
FIG. 34 illustrates a view of the large water bottle ready for removal, of the water, cleaner, and wipe supply station.

Referring to FIG. 34, a view of the large water bottle ready for removal of the water, cleaner, and wipe supply station is shown.

The large bottle clamp assembly 150 is then moved upward by the large bottle clamp actuator 151, allowing removal of the large bottle 202.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. It is the intention of the following claims to encompass and include such changes.

What is claimed is:

1. A device for cleaning and filling one or more water bottles, the device comprising:
   a rotating platform;
      the rotating platform including one or more recesses to support the one or more water bottles;
      the rotating platform holding the one or more water bottles in an inverted position for cleaning, and an upright position for filling;
   a clamp assembly;
      the clamp assembly controlled by an actuator;
      the clamp assembly able to hold the one or more water bottles against the rotating platform, and then able to release the one or more water bottles;
   a water-filtration system;
      the water-filtration system filtering water from a water source and removing contaminants to create filtered water;
   a steam-cleaning system;
      the steam-cleaning system using filtered water, heated to create steam, the steam used to clean the one or more water bottles before filling;
   a towel rolling and cutting system;
      the towel rolling and cutting system including:
      a bulk towel roll of towel material;

the towel material guided along one or more towel guide tracks to a towel perforation knife roller operated by a first towel perforation motor and a towel perforation knife receiving roller operated by a second towel perforation motor;

the towel perforation knife roller and the towel perforation knife receiving roller gripping a first side of the towel material and a second side of the towel material, perforating the towel material to guide tearing;

a towel clamp bar, powered by a towel clamp motor, gathering the towel material around itself;

wherein when the towel clamp bar has gathered sufficient towel material, the towel material is torn and dropped into a towel container;

whereby the towel rolling and cutting system can refill the towel container provided by a user; and whereby a user places one or more water bottles on the rotating platform, the clamp assembly grips the one or more water bottles, the rotating platform and the clamp assembly rotate to an inverted position, the one or more water bottles are cleaned using the steam-cleaning system, the one or more water bottles are rotated to an upright position, and finally the one or more water bottles are filled using filtered water.

2. The device for cleaning and filling one or more water bottles of claim 1, wherein:

the rotating platform includes a first side with one or more small recesses for small water bottles, and a second side with one or more recesses for large water bottles;

thereby allowing a user to choose whether small or large bottles are to be cleaned and filled.

3. The device for cleaning and filling one or more water bottles, of claim 1, further comprising:

a mixing tank assembly that includes:
a mixing vessel that will hold a combination of filtered water and concentrated cleaning solution;
a mixing motor that connects to a mixing paddle via a mixing shaft, whereby rotation of the mixing motor causes rotation of the mixing paddle, thus blending filtered water and concentrated cleaning solution to create a diluted cleaning solution;
a reverse-osmosis water pump that moves water into the mixing vessel;
a concentrate pump that moves concentrated cleaning solution into the mixing vessel;
a cleaning solution pump that moves the diluted cleaning solution out of the mixing vessel;
wherein the diluted cleaning solution is discharged into a container provided by the user.

4. The device for cleaning and filling one or more water bottles, of claim 3, further comprising:

a cleaner dispensing station;
the cleaner dispensing station including a location where a user places an empty bottle of cleaning solution, the device then refilling the empty bottle of cleaning solution using diluted cleaning solution mixed within the mixing tank assembly.

5. The device for cleaning and filling one or more water bottles, of claim 1, further comprising:

a mixing tank assembly that includes:
a mixing vessel that will hold a combination of filtered water and concentrated cleaning solution;
a mixing motor that connects to a mixing paddle via a mixing shaft, whereby rotation of the mixing motor causes rotation of the mixing paddle, thus blending filtered water and concentrated cleaning solution to create a diluted cleaning solution;
a reverse-osmosis water pump that moves water into the mixing vessel;
a concentrate pump that moves concentrated cleaning solution into the mixing vessel;
a cleaning solution pump that moves the diluted cleaning solution out of the mixing vessel;
wherein the diluted cleaning solution is discharged into a container provided by the user.

6. The device for cleaning and filling one or more water bottles, of claim 1, wherein the towel rolling and cutting system further comprises:

a towel solution dispensing nozzle;
the towel solution dispensing nozzle adding a solution of concentrated cleaning product and filtered water to the towel container;
the towel material within the towel container absorbing the solution, creating pre-moistened towels useful for cleaning.

7. The device for cleaning and filling one or more water bottles, of claim 5, wherein the towel rolling and cutting system further comprises:

a towel solution dispensing nozzle;
the towel solution dispensing nozzle adding a solution of concentrated cleaning product and filtered water to the towel container;
the towel material within the towel container absorbing the solution, creating pre-moistened towels useful for cleaning.

8. A system for cleaning and refilling water bottles comprising:

a rotating platform able to support one or more water bottles;
the rotating platform including recesses of at least two sizes: a small recess for supporting small water bottles, and a large recess for supporting large water bottles;
the rotating platform to hold the one or more water bottles in an inverted position for cleaning, and an upright position for filling;
a small bottle clamp assembly controlled by a small bottle clamp actuator;
the small bottle clamp assembly able to hold one or more water bottles in the small recess;
a large bottle clamp assembly controlled by a large bottle clamp actuator;
the large bottle clamp assembly able to hold one or more water bottles in the large recess;
a mixing tank assembly that includes:
a mixing vessel that will hold a combination of filtered water and concentrated cleaning solution;
a mixing motor that connects to a mixing paddle via a mixing shaft, whereby rotation of the mixing motor causes rotation of the mixing paddle, thus blending filtered water and concentrated cleaning solution to create a diluted cleaning solution;
a reverse-osmosis water pump that moves water into the mixing vessel;
a concentrate pump that moves concentrated cleaning solution into the mixing vessel;
a cleaning solution pump that moves the diluted cleaning solution out of the mixing vessel;
whereby a user places one or more water bottles onto the rotating platform, the small bottle clamp assembly or the large bottle clamp assembly holds the one or more water bottles against the rotating platform, and the water bottles are then cleaned and filled; and wherein the diluted cleaning solution is discharged into a container provided by the user.

9. The system for cleaning and refilling water bottles of claim 8, further comprising:

a towel rolling and cutting system;

the towel rolling and cutting system including:

a bulk towel roll of towel material;

the towel material guided along one or more towel guide tracks to a towel perforation knife roller operated by a first towel perforation motor and a towel perforation knife receiving roller operated by a second towel perforation motor;

the towel perforation knife roller and the towel perforation knife receiving roller gripping a first side of the towel material and a second side of the towel material, perforating the towel material to guide tearing;

a towel clamp bar, powered by a towel clamp motor, gathering the towel material around itself;

wherein when the towel clamp bar has gathered sufficient towel material, the towel material is torn and dropped into a towel container;

whereby the towel rolling and cutting system can refill the towel container provided by a user.

10. The system for cleaning and refilling water bottles of claim 9, wherein the towel rolling and cutting system further comprises:

a mixing tank assembly that includes:

a mixing vessel that will hold a combination of filtered water and concentrated cleaning solution;

a mixing motor that connects to a mixing paddle via a mixing shaft, whereby rotation of the mixing motor causes rotation of the mixing paddle, thus blending filtered water and concentrated cleaning solution to create a diluted cleaning solution;

a reverse-osmosis water pump that moves water into the mixing vessel;

a concentrate pump that moves concentrated cleaning solution into the mixing vessel;

a cleaning solution pump that moves the diluted cleaning solution out of the mixing vessel;

wherein the diluted cleaning solution is discharged into a container provided by the user.

11. The system for cleaning and refilling water bottles of claim 10, wherein the towel rolling and cutting system further comprises:

a towel solution dispensing nozzle;

the towel solution dispensing nozzle adding a solution of concentrated cleaning product and filtered water to the towel container;

the towel material within the towel container absorbing the solution, creating pre-moistened towels useful for cleaning.

12. The system for cleaning and refilling water bottles of claim 9, wherein the towel rolling and cutting system further comprises:

a towel solution dispensing nozzle;

the towel solution dispensing nozzle adding a solution of concentrated cleaning product and filtered water to the towel container;

the towel material within the towel container absorbing the solution, creating pre-moistened towels useful for cleaning.

13. The system for cleaning and refilling water bottles of claim of claim 8, further comprising:

a cleaner dispensing station;

the cleaner dispensing station includes a location where a user places an empty bottle of cleaning solution, the system then refilling the empty bottle of cleaning solution using diluted cleaning solution mixed within the mixing tank assembly.

14. A system for cleaning and refilling water bottles comprising:

a rotating platform able to support one or more water bottles;

the rotating platform including recesses of at least two sizes: a small recess for supporting small water bottles, and a large recess for supporting large water bottles;

the rotating platform to hold the one or more water bottles in an inverted position for cleaning, and an upright position for filling;

a small bottle clamp assembly controlled by a small bottle clamp actuator;

the small bottle clamp assembly able to hold one or more water bottles in the small recess;

a large bottle clamp assembly controlled by a large bottle clamp actuator;

the large bottle clamp assembly able to hold one or more water bottles in the large recess;

a towel rolling and cutting system;

the towel rolling and cutting system including:

a bulk towel roll of towel material;

the towel material guided along one or more towel guide tracks to a towel perforation knife roller operated by a first towel perforation motor and a towel perforation knife receiving roller operated by a second towel perforation motor;

the towel perforation knife roller and the towel perforation knife receiving roller gripping a first side of the towel material and a second side of the towel material, perforating the towel material to guide tearing;

a towel clamp bar, powered by a towel clamp motor, gathering the towel material around itself;

wherein when the towel clamp bar has gathered sufficient towel material, the towel material is torn and dropped into a towel container;

whereby the towel rolling and cutting system can refill the towel container provided by a user; and whereby the user places one or more water bottles onto the rotating platform, the small bottle clamp assembly or the large bottle clamp assembly holds the one or more water bottles against the rotating platform, and the water bottles are then cleaned and filled.

\* \* \* \* \*